R. RICHARDSON.
Glass-Melting Pots.

No. 152,687. Patented June 30, 1874.

WITNESSES.

INVENTOR.
R. Richardson
BY
ATTORNEYS.

UNITED STATES PATENT OFFICE.

ROBERT RICHARDSON, OF BROOKLYN, NEW YORK.

IMPROVEMENT IN GLASS-MELTING POTS.

Specification forming part of Letters Patent No. 152,687, dated June 30, 1874; application filed May 29, 1874.

*To all whom it may concern:*

Be it known that I, ROBERT RICHARDSON, of Brooklyn, Kings county, New York, have invented a new and Improved Glass-Melting Pot, of which the following is a specification:

The invention consists in improving the construction of glass-melting pots, as hereinafter described, and pointed out in the claim.

Figure 1:
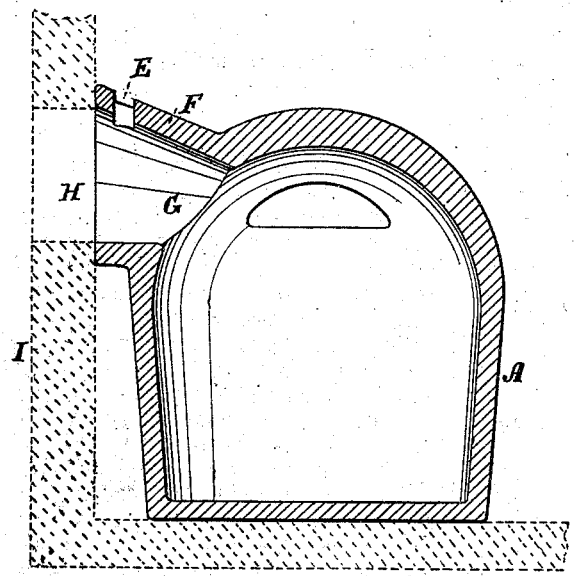
Figure 2:
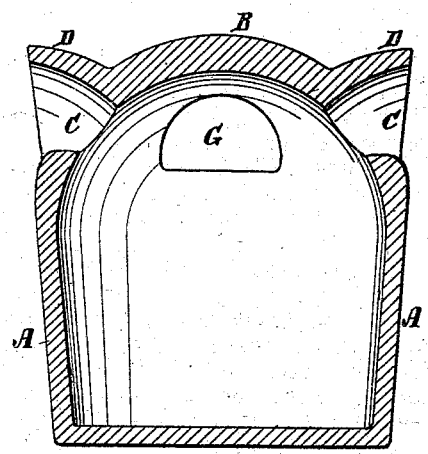
Figure 3:
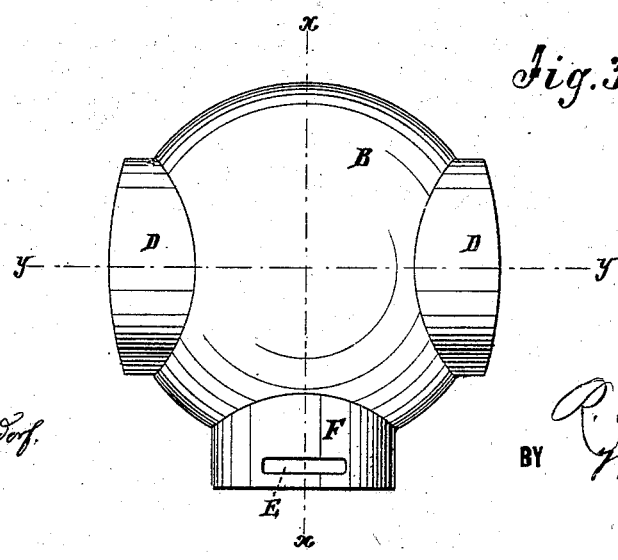

In the accompanying drawing, Figures 1 and 2 are sectional elevations of my improved pot, taken on the lines $x\,x$ and $y\,y$ of Fig. 3; and Fig. 3 is a plan view.

Commonly these pots are wholly closed to the heat, so that it only acts through the walls; but in some cases they have been made with open tops. In the latter case the carbon particles and other matters falling from the upper portion of the furnace and the flue into the glass give it a dark-green color and spoil it for fine goods; hence, for all except the lowest grades of goods, the pots have had to be closed at the top. The closed pots are objectionable, because they resist the heat, so that it takes about twenty-six hours to heat the glass to the same degree that it can be heated in about half the time in an open pot.

I therefore propose to make the pots A with a cover, B, about the same as the ordinary covered pots, but with two or more large openings, C, at the junction of the cover with the sides of the pot, or thereabout, and with raised portions D of the cover projecting over said openings, so as to prevent the falling of any matters from the top of the furnace and the flue into the pot. I also propose to make a small opening, E, through the top of the wall F, surrounding the mouth G of the pot, to permit of the escape back into the furnace of any portion of the heat currents that may, in consequence of draft through openings C, tend to come out at the opening H in the furnace-wall I, through which the glass is taken from the pot. The pot will be arranged in the furnace in all respects the same as the ordinary pots. With these openings through the pot, the action of the heat on the glass is about as quick as with a pot wholly open at the top.

Having thus described my invention, I claim as new and desire to secure by Letters Patent—

A glass-melting pot having a slot or opening, E, in the top of wall F of mouth G, as and for the purpose specified.

ROBT. RICHARDSON.

Witnesses:
T. B. MOSHER,
ALEX. F. ROBERTS.